Figure 1:
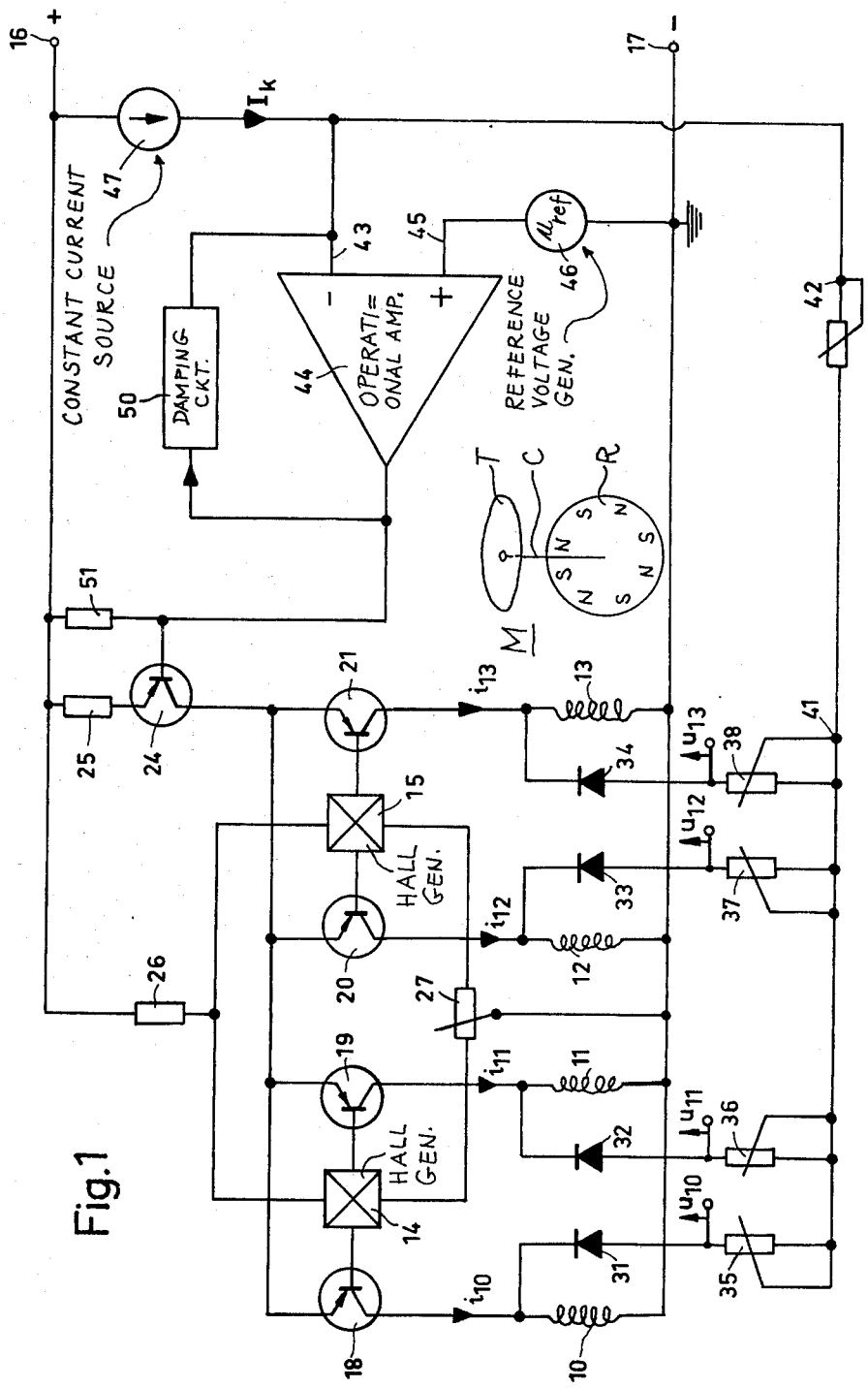

United States Patent [19]
Doemen

[11] 3,924,166
[45] Dec. 2, 1975

[54] SPEED CONTROL SYSTEM FOR LOW SPEED BRUSHLESS D-C MOTORS

[75] Inventor: Benno Doemen, St. Georgen, Germany

[73] Assignee: Papst-Motoren KG, St. Georgen, Germany

[22] Filed: Oct. 1, 1973

[21] Appl. No.: 402,259

[30] Foreign Application Priority Data
Oct. 19, 1972  Germany............................ 2251292

[52] U.S. Cl. ................. 318/138; 318/254; 318/331
[51] Int. Cl.² ...................... H02K 29/02; H02P 5/06
[58] Field of Search...................... 318/138, 254, 331

[56] References Cited
UNITED STATES PATENTS

| | | | |
|---|---|---|---|
| 3,488,566 | 1/1970 | Fukuda | 318/254 |
| 3,504,252 | 3/1970 | Moczala | 318/138 |
| 3,584,280 | 6/1971 | Inagaki | 318/138 |
| 3,611,081 | 10/1971 | Watson | 318/138 |
| 3,648,137 | 3/1972 | Mieslinger | 318/254 |
| 3,651,368 | 3/1972 | Hanada | 318/254 |
| 3,757,185 | 9/1973 | Brunner | 318/254 |

*Primary Examiner*—Robert K. Schaefer
*Assistant Examiner*—John J. Feldhaus
*Attorney, Agent, or Firm*—Flynn & Frishauf

[57] ABSTRACT

The voltages induced in the motor windings of a permanent magnet d-c motor, preferably an axial air gap motor are sensed, half-wave rectified and added in an adder circuit which is connected so that at least a portion of the instantaneous rectified voltages as added, and used as a speed control signal for a speed regulator. The adder circuit may be adjusted in such a way that control signals of double the frequency of modulation with respect to the induced voltages derived from the motor windings at the then instantaneous motor speed are obtained, so that such low speeds as, for example, 33-1/3 rpm, for direct drive of phonograph turntables can be accurately controlled, especially if a motor having a higher number of poles, e.g. 8 poles, is used.

21 Claims, 4 Drawing Figures

SPEED CONTROL SYSTEM FOR LOW SPEED BRUSHLESS D-C MOTORS

The present invention relates to a speed control circuit for use with a brush-less d-c motor, and more particularly to such a system which is suitable to control a low speed motor for direct drive of audio or video equipment, typically phonograph turntables and record changers.

Various speed control systems have been proposed; for example, U.S. Pat. No. 3,329,852 discloses a two-pole-motor in which four windings, electrically and mechanically spaced by 90°, generate a rotary field for a two-pole permanent magnet rotor. The permanent magnet rotor, during rotation, induces voltages in the coils when they are not current carrying. These voltages are rectified by a four-phase half-wave rectifier circuit, to obtain a d-c voltage which has a modulating wave superimposed thereon. Most speed control systems are designed for motors operating at a comparatively high rate; in the type of motor described in U.S. Pat. No. 3,329,852 the speed is about 3,000 rpm; the modulating frequency is then 200 Hz. At such frequency, the rectified control voltages can easily be filtered, so that the half-wave rectifier can readily provide a suitable control voltage. Only short time constants are required in the smoothing filter circuit and at rotary speeds in the order of thousands of rpm, a good control dynamic is obtained.

Motors operating at low speeds, and particularly motors operating at speeds which are suitable for direct drive of phonograph turntables and record changers require accurate speed control; the frequency, and speed relationships, however, are so different that control systems as proposed in the aforementioned can no longer be used directly. Direct drive of a turntable is highly desirable. Difficulties in gearing, or speed transmission by friction drives or belt drives are thereby avoided. If the motor of the control system of the aforementioned patent were to be designed for operation at 33⅓ rpm, the modulating frequency superimposed on the signal would be about 2.2 Hz at a very low induced voltage, which will be the result of keeping the number of turns of the various coils low, so that the motor will reach operating speed rapidly. Even if the number of poles of that motor were increased to say eight poles corresponding to a modulating frequency of 8.9 Hz at 33⅓ rpm, it would be practically impossible to provide a smooth output voltage by means of filter circuits at such frequencies, since the high time constants of the filter circuits would so affect the dynamics of the control loop that high fidelity sound quality could no longer be obtained from this type of a motor drive. The time constants in the circuits would lead to danger of overshoots and hunting.

Connecting a controller into a circuit in which the signal has a substantial modulation coeffecient provides a signal to the controller which, as looked at from the controller, simulates variations in speed, due to the modulation superimposed on the signal itself. At the low frequency of these modulations, the controller would respond to the superimposed modulation, as if it were a speed variation. At the valley of the modulation frequency the controller would react as if the speed of the turntable had dropped below commanded speed and would connect additional drive current for the motor; at the peaks, the controller would react as if the speed of the turntable had exceeded commanded speed and would cut drive power. The controller would thus react by supplying to the motor a large number of short current pulses which control the motor to run at a constant average speed but have an undesirable phase position. Due to the short duration of the pulses and their relative steep pulse flanks, the rotor will be supplied with short torque pulses. It is difficult to supply sufficient mechanical inertia (and still provide reasonable start-up times) and, therefore, such pulses when applied to a turntable would be noticed upon audio reproduction as a low frequency rumble. The extent of this rumble cannot be tolerated in true high fidelity equipment.

It is an object of the present invention to provide a direct drive brushless d-c motor and control system therefore which is suitable to operate at low speeds and which can accurately hold the commanded speed.

SUBJECT MATTER OF THE PRESENT INVENTION

Briefly, an adder circuit is provided and connected to add at least a portion of the instantaneous values of induced voltages in the windings of the motor, the added signal being applied to a controller. By pure addition of the signals, a desirable phase position of the modulating frequency is obtained, and thus the phase position of the aforementioned pulses being applied to the motor is substantially improved. The drive, then, will become suitable for tape decks and the like.

In accordance with a preferred embodiment of the invention, the circuits which sense the induced voltages includue a known polyphase half-wave rectifier which is so connected that, by addition of out-of-phase voltages, a modulating frequency is obtained which has double the frequency of the voltage induced in the windings. The control voltage thus will have a double-frequency modulation superimposed thereon. This double-frequency modulation can be filtered by means of filters with relatively low time constants, substantially improving the control dynamics of the entire speed control loop. By suitable selection of the resistance values the double-frequency signed will have substantially equal positive and negative amplitudes, these amplitudes will be substantially smaller than the amplitudes of the modulating frequency obtained with the known circuit, for example as explained in the aforementioned patent. This, additionally, substantially simplifies filtering and further improves the control dynamics at low speeds.

Figure 2:
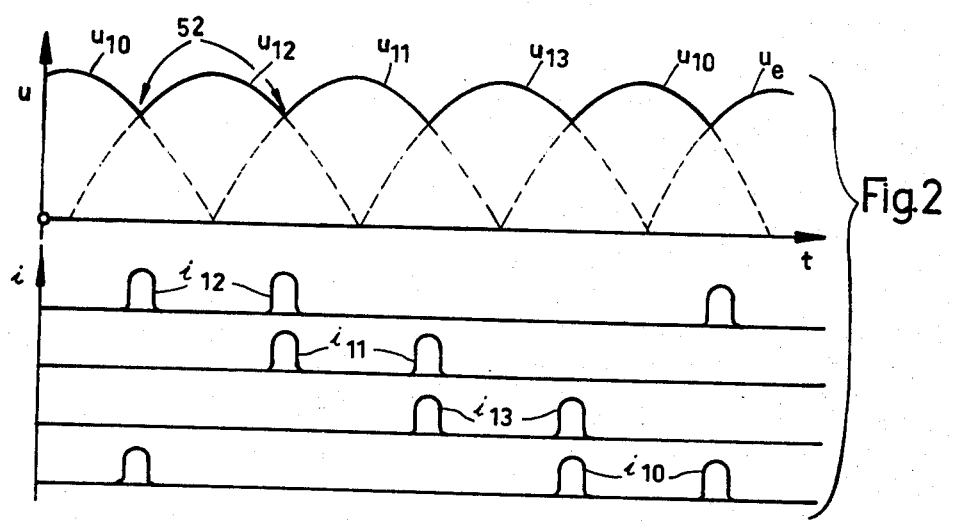
Figure 3:
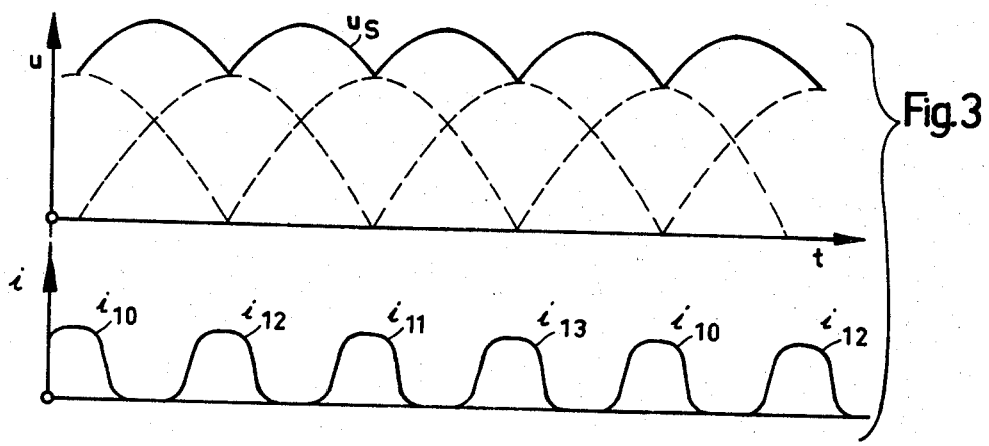
Figure 4:
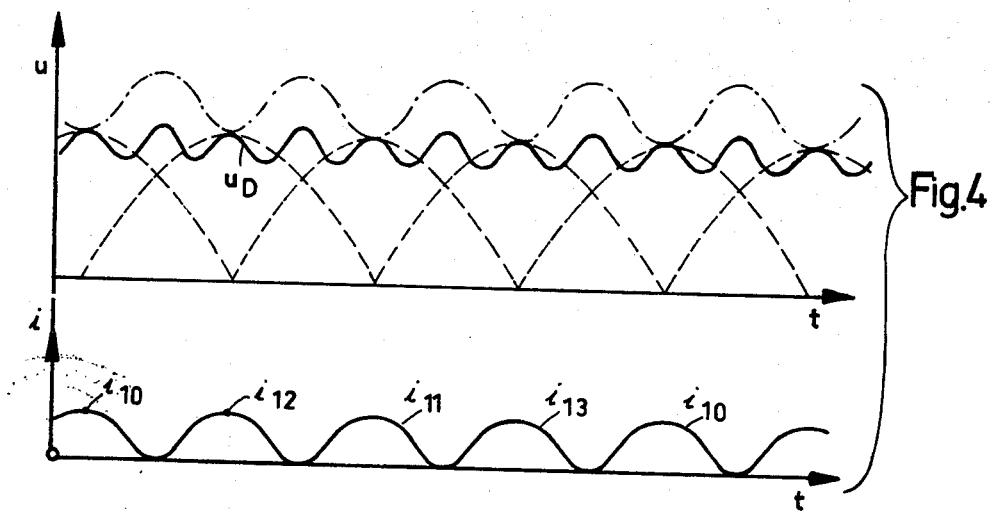

The invention will be described by way of example with reference to the accompanying drawings, wherein:

FIG. 1 is a schematic circuit diagram of a motor control system in accordance with the present invention, connected to a motor driving a high fidelity phonograph turntable and FIGS. 2–4 are graphs illustrating currents and voltages arising in the system in accordance with the present invention and useful in connection with the explanation of the operation thereof.

A brushless d-c motor, for example as described in application Ser. No. 285,520 now U.S. Pat. No. 3,845,339, published as German Disclosure Document 2,143,752, assigned to the assignee of the present invention, to which cross-reference is made, is schematically indicated at M in FIG. 1; it has four circuits 10, 11, 12, 13. Each circuit a comprises a number of series connected coils, e.g. eight coils in the case of an eightpole-motor as shown in the cross-referenced application. The coils cooperate with a schematically indicated multipole permanent magnet rotor R, the shaft of which is directly coupled as schematically indicated by dashed line connection C with a turntable T. The four circuits 10, 11, 12, 13 are 90° electrically displaced with respect to each other. Two electrically 90° spaced Hall generators 14, 15 or equivalent electrical control elements are located to be in the magnetic field of the rotor R. The motor is supplied with direct current from a d-c source which has positive and negative terminals 16, 17 which, preferably is a regulated power supply, especially if it is to be used for low speed applications. All four circuits 10–13 have one terminal connected to negative terminal 17 of the source; the other terminals of the circuits 10–13 are connected, respectively, to the collector of a pnp transistor 18, 19, 20, 21. The emitters of the transistors 18–21 are connected to the collector of a pnp control transistor 24, the emitter of which is connected over resistor 25 with positive terminal 16 of the source. The bases of the transistors 18, 19 are connected to the control outputs of the Hall generator 14; the bases of transistors 20, 21 are connected to the control outputs of the Hall generator 15. The Hall generators 14, 15 are supplied over a common supply resistor 26 from positive bus 16; the other current supplies of the Hall generators 14, 15 are connected to the end points of a potentiometer 27, the tap point of which is connected to negative bus 17.

Transistors 18–21, as controlled by Hall generators, 14, 15 cyclically become conductive, in order to provide a rotary field in the motor which carries along the permanent magnet rotor R, similar to the operation of a synchronous motor. During the off current time of the coils, the rotor will induce therein sinusoidal voltages having amplitudes substantially proportional to the speed of the motor. These voltages are sensed by four diodes 31, 32, 33, 34. Adjustable resistors 35, 36, 37, 38 are connected in series with the diodes 31–34, respectively. All the resistors 35–38 have their other terminals connected together at a common junction 41. Junction 41 is connected over an adjustable resistor 42 with the input 43 of an amplifier 44. In a preferred form, and shown in FIG. 1, the amplifier is an operational amplifier and the input connection is to the inverting terminal thereof. A second input to the operational amplifier, the non-inverting input 45 is connected to a reference voltage generator 46 which provides a speed control reference. This reference voltage generator may be any known circuit, for example a Zener diode circuit, connected between the input 45 and negative bus 17. If a voltage-regulated or stabilized power-supply is used, input 45 simply is connected to a voltage divider connected between buses 16 and 17.

A constant current source 47 is connected between positive bus 16 and the amplifier input 43 of amplifier 44. This circuit, again, may be a known circuit which, for example, may include a controlled transistor in a feedback circuit. If a regulated or stabilized power supply is used, circuit 42 may simply take the form of a resistor having a sufficiently high value, e.g. 12000 ohms for 15-volt regulated power supplied to terminals 16, 17. A constant current $I_k$ supplied by source 47 flows over resistors 35–38 in dependence on the instantaneous values of the induced voltage across circuits 10–13.

The operational amplifier 44 has a feedback circuit 50 which includes damping or filtering elements. The output of the amplifier 44 is connected to the base of transistor 24 to control conduction of the transistor 24; a resistor 51 connects the base of transistor 24 to positive bus 16. Transistor 24 carries the whole current of the motor. At low speeds this has proved to be advantageous.

Operation, with reference to FIGS. 2–4: Let it be assumed, first, that the input 43 of operational amplifier 44 is more positive than input 45. This condition pertains during starting of the motor, that is, during the time that the turntable reaches speed. The motor accelerates. Commutation of current to the respective circuits is controlled by the Hall generators 14, 15, which, in turn, are controlled by the permanent magnet rotor R of the motor, to provide respective control voltages to the transistors 18 to 21. Transistor 24 is constantly conductive, since the amplifier 44 constantly supplies current to the base of the control transistor 24.

Let it be assumed, initially, that the resistors 35 to 38 have a resistance value of approximately 0, or only a very small value to compensate for differences in inherent resistance of diodes 31–34 and/or of the circuits 10–13. The control circuit then will operate like a normal four-phase half-wave rectifier. The phase number will depend on the motor construction; it may, for example, be six-phase, or three-phase, depending on the number of coils and the design of the motor itself. The output of the four-phase half-wave rectifier (FIG. 1) will be a wavy d-c signal $u_e$, as illustrated in the top graph of FIG. 2. As seen in FIG. 2, this signal $u_e$ which is the envelope of the voltages $u_{10}$, $u_{11}$, $u_{12}$, $u_{13}$ is not a pure sine wave. When using an 8-pole-motor at 33⅓ rpm, the frequency of that signal will be 8.9 Hz. At low speeds of the motor it is practically impossible to filter this wavy voltage to eliminate undulations since otherwise the dynamic control response time would be seriously extended, and control would be very slow and inaccurate. Due to the signal, the transistor 24 would be rendered conductive at the instances indicated at 52 in the top graph of FIG. 2 so that the respective ones of the transistors 18, 19, 20, 21 which, at that time is or are commanded to be conductive by the respective Hall generator 14, 15 will be rendered conductive not once, but rather twice and, in each instance, at the wrong time, that is, at an undesirable instantaneous position of the rotor R. This is indicated in FIG. 2 in the bottom four lines by currents $i_{10}$ to $i_{13}$, which are also indicated in FIG. 1. These current peaks produce corresponding torque pulses that are highly undesirable in high fidelity equipment.

To obtain uniform torque it would be desirable, assuming sinusoidal magnetization of the permanent magnet of the rotor R, that the currents $i_{10}$ to $i_{13}$ likewise be sinusoidal, or as close to it as possible, and that they should be in phase with the induced half waves $u_{10}$ to $u_{13}$ (FIG. 2).

A voltage wave which corresponds to the d-c signal, modulated according to the full line of FIG. 2 can be sensed if a resistor 42 of finite value is connected as shown in FIG. 1, and as explained below.

Let it next be assumed that the four resistors 35 to 38 are changed to have a finite resistance value, for example 1.2 KΩ. The constant current to be supplied by source 47 then should have a value of:

$$I_k \geq \frac{u_{10\ldots13}}{R_{35\ldots38}}, \text{ e.g. } \geq \frac{u_{12}}{R_{37}} \qquad (1)$$

The value of $I_K$ must have a minimum value as above indicated in formula (1) if the additive effect of resistors 35 to 38 is to become fully effective.

The instantaneous voltage at terminal 43 of the amplifier 44 will then be representative of the instantaneous value of the sum of the voltages (i.e. the algebraic instantaneous value) induced in the windings of circuits 10 to 13, as rectified by rectifiers 31 to 34. These are the voltages $u_{10}$ to $u_{13}$, as indicated in FIGS. 1 and 2. At the output of the amplifier 44, a sum signal having a voltage $u_s$ will appear:

$$u_s = m\,(u_{10} + u_{11} + u_{12} + u_{13}) \qquad (2)$$

in which $m$ is a factor less than 1 (for example ½), but can be increased by suitable adjustment of the amplification factor of amplifier 44 to a value of unity, or greater.

The upper row of FIG 3 illustrates the voltage $u_s$ for $m = 1$. This voltage is an a-c voltage of wave shape which is not a pure sine wave. As can be clearly seen the modulation, that is the waviness of the superposed, or sum voltage $u_s$ has a much better phase position with respect to the induced voltages $u_{10}$ to $u_{13}$, than the envelope of the voltages themselves, as seen in FIG. 2. (The negative halves of these voltages are suppressed by diodes 31–34). Thus, the transistors 18 to 21 are commanded to switch ON at the proper instant, as seen in the second line of FIG. 3, representative of current through the respective transistors 18–23. The ON-connection period of the respective transistors is still fairly short, so that control by utilizing the pure sum voltage $u_s$ is not suitable for those applications where extreme demands are made on uniformity of torque delivered by the motor. If the mechanical system, itself, has sufficient inertia (as is the case, usually, in tape recorders) then such pure summing circuits may be suitable, since they are clearly more advantageous than the circuit described in connection with FIG. 2.

For particularly low speeds the resistors 35 to 38, as well as resistor 42 are given finite values, for example 400 ohms for resistors 35 to 38, and 800 ohms for resistor 42. A dual effect is then obtained, that is, a combination or superposition of the effects of FIGS. 2 and 3. A negative d-c voltage $U_D$ (FIG. 4) is obtained which has a superimposed modulation the frequency of which is double that with respect to the modulation frequency of the previous examples of FIGS. 2 and 3. In the case of an eight-pole-motor operating at 33⅓ rpm, the frequency is 17.8 Hz. Giving the resistor 42 a finite value adds the base voltage (full line of graph 1 of FIG. 2) to the summed voltage (full line of graph 1 of FIG. 3); the resistance of resistor 42 is, preferably, given such a value that the wave excursions of the modulating frequency have an approximately constant amplitude. This facilitates filtering in two respects: the frequency of the modulating wave to be filtered is now twice that of the frequency of voltage $u_s$ (FIG. 3) (assuming constant motor speed) and the amplitude of the modulating frequency, which has to be filtered has been substantially decreased. Slight differences in amplitude of voltage $u_D$ as shown in FIG. 4 may be advantageous in order to switch transistor 24 in the desired phase-relationship with the induced voltages $u_{10}$ to $u_{13}$ as explained above. The resistance values of the group of resistors 35 to 38, as well as the resistance value of resistor 42 must be carefully selected in order to obtain the wave shapes explained in connection with FIGS. 2 and 3 and hence FIG. 4. The resistance values, as can be seen from the above examples, of these resistors are high with respect to the internal resistance of the circuit-rectifier combination formed by the windings of the circuits 10–13, and the rectifying diodes 31–34 connected thereto. It is, of course, well within the state of the art to provide compensating resistors in series with rectifying diodes in order to compensate for minor variations in the inherent, or internal resistance of the rectifying diodes, which are practically impossible to avoid, even under controlled mass-production conditions. The resistance values, as is apparent from the above identified example, to be used in order to obtain the wave shapes as explained in connection with FIGS. 3 and 4 are, of course, of a different magnitude, and are not provided because of differences in resistance of the circuits to which they are connected. They are not, and do not function as compensating resistors; rather, the resistors 35–38 actually function as adder resistors, by virtue of their connection to the constant current source 47; the resistance value of the resistors 35–38, each, is essentially the same and bears a definite proportion to the resistance value of resistor 42, if resistor 42 is used to obtain the effects explained in connection with FIG. 4.

The actual value of the resistors 35–38 and of resistor 42, if used, depends on the value of induced voltage in the circuits of the coils 10 to 13, as rectified by the diodes 31–34. A representative value of induced voltage $u_{10} - u_{13}$ would be, for example, about 1.5 V.

The voltage $U_D$ provides in the respective circuits of the motor, a current of a wave shape which is approximately sinusoidal, so that, even at low speeds as required for example by a high fidelity record turntable of 33⅓ rpm, accurately uniform speed as required by high fidelity equipment can be obtained.

When changing speed, as is common in record changers, the relationship of the value of resistor 42 to the resistance values of resistors 35 to 38 will also have to be changed for optimum control. This can be accomplished by means of the speed-changing switch. It is also possible to change the value of the reference voltage supplied by reference voltage generator 46, and the resistance values of resistors 35 to 38.

Compensation for variation in voltage, and temperature can be obtained by additional compensating circuits, as known. The use of the operational amplifier for amplifier 44 provides uniform change of characteristics with change in temperature of all critical elements and thus rapid adjustment to constant operating conditions after first connecting the system.

The above embodiment has been described in connection with an eight-pole brushless d-c motor as disclosed in Ser. No. 285,520. The invention may be used with other types of brushless d-c motors as well. When using a two-pole-motor as shown in the U.S. patent referred to, for example, the lowest speed would be about four times the lowest speed attainable with an eight-pole-motor if the doubled frequency is to have a value in the order of magnitude of 18 Hz as suitable for filtering. This is a substantially lower speed than can be obtained with the known circuit. The lowest allowable frequency will be influenced by such considerations as quality of control, inertia of the drive system etc. In a drive system having a high mass of inertia the doubled frequency may have a lower value than in a drive system with lesser inertia. At low speeds, such as 33⅓ it is of course recommendable to use both high inertia and a multi-pole motor in order to obtain optimum results.

Motors with smaller numbers of poles can be used for higher speed ranges. An ordinary two-pole brushless motor will have a lower speed limit in the order of about 130 rpm. This results in about the same frequency at the amplifier input and would be suitable, for example, for the capstan drive for a tape recorder, or the like.

Using the combination of the resistor for the constant current source 47 and a voltage divider for the reference voltage generator 46, connected to a stabilized regulated voltage source provides sufficiently constant unvarying operating values for the purposes of the present invention, and therefore provides a system which is simple and uses a minimum of circuit components subject to changes in operating characteristics upon changes in ambient conditions such as temperature.

The adder circuit formed of resistors 35–38, and resistor 42, if used, additionally has the function of modifying the values to be added by factors which are so related to each other that the resultant waves of FIG. 3, or FIG. 4, respectively, are obtained. Thus, while the adder circuit operates or functions as an adding circuit, it additionally provides modifying factors to the values to be added so that the added values will have the proper relationship to each other, as described.

Various changes and modifications may be made within the scope of the inventive concept.

I claim:

1. Brushless d-c motor (M) and speed control combination system in which the motor (M) has a permanent magnet rotor (R) and stator armature windings (10–13), comprising controlled commutating switches (18–21) connected in a supply circuit to respective armature windings of the motor;

diodes (31–34) having one terminal each coupled to respective armature windings (10–13) and deriving sensed undulating d-c signals representative of voltages (FIGS. 2: $u_{10}$, $u_{11}$, $u_{12}$, $u_{13}$) induced in the stator armature windings (10–13) upon passage of the permanent magnetic rotor (R) past said windings during the interval when said armature windings carry no current due to blocking of supply power to respective windings by respective ones of said switches;

the other terminals of the diodes (31–34) being connected to a common junction (41), said common junction having applied thereto a d-c voltage having an amplitude which is dependent on motor speed and a superimposed first a-c voltage ($u_e$) of non-sinusoidal wave shape, the frequency of which is likewise dependent on motor speed;

a first adder circuit (35–38; 47) connected to said diodes (31–34) and adding at least a portion of each of the instantaneous values of the sensed undulating d-c signal to thus obtain a second a-c voltage of non-sinusoidal wave shape, and of a phase which is opposite that of said first a-c voltage;

a second adder circuit (42) connected to said common junction (41) and having said second voltage connected thereto to superimpose or instantaneously, algebraically add said first and second voltages so that superimposed, or algebraically added output voltages will appear as an output signal ($u_D$) at the output (43) thereof;

and a speed control circuit (24, 25; 44) connected to said output (43), controlled by the superimposed added first and second a-c voltages forming the output signal ($u_D$) thereat, and having its control output connected to control energization of the controlled commutation switches (18–21).

2. System according to claim 1 wherein the second adder (42) adding the out-of-phase first and second a-c voltages is adjusted to modify the voltages to be added to obtain a resultant output signal ($u_D$), at said double frequency of modulation, having waves of approximately equal amplitude excursions.

3. System according to claim 1 wherein the means rectifying said voltages comprises a group of diodes (31–34) connected as polyphase half-wave rectifiers; and the first adder circuit includes a group of resistors (35–38), one resistor each respectively connected in series with each diode (31–34), all said series diode-resistor circuits having their free terminals connected at the common junction (41);

the second adder circuit (42) being connected to said common junction (41).

4. System according to claim 3 wherein the second adder circuit comprises an additional adding resistor (42) connected in series between the speed control circuit (44) and the common junction (41).

5. System according to claim 4, wherein the relative resistance values of the respective reistors (35–38) of the group, and of the additional adding resistor (42) are selected to produce an added a-c voltage output ($u_D$) having twice the frequency of the first a-c voltage.

6. System according to claim 5, wherein the relative resistance values are selected to provide an added resultant output signal at said double-frequency modulation having waves of approximately equal amplitude excursions.

7. System according to claim 4 wherein at least some of the resistors (35–38; 42) are adjustable to provide for weighting the respective voltages upon addition thereof.

8. System according to claim 3 wherein said speed control circuit comprises a control amplifier (44) having a feedback circuit (50) including a damping or filtering circuit and interconnecting the output and input (43) of the control amplifier.

9. System according to claim 8 wherein said control amplifier is an operational amplifier (44).

10. System according to claim 3 wherein the adder circuits include a source (47) of substantially constant current (47); the speed control circuit comprises an operational amplifier;

said source (47) and the common junction (41) are connected to one terminal (43) of the operational amplifier;

and a reference command source (46) connected to the other input terminal (45) of the operational amplifier.

11. System according to claim 10 wherein the second adder circuit comprises an additional adder resistor (42) connected between said common junction (41) and said one input terminal (43) of the operational amplifier (44) so that current from said source (47) of substantially constant current will flow through said additional resistor (42) and through the resistors (35–38) of said group of resistors, dividing into said resistors in accordance with the then instantaneously induced voltages in the armature windings, the voltage being applied to said one terminal (43) of the operational amplifier (44) being the sum of the voltages induced in said windings and of a signal representative of the individual instantaneous voltage induced in any one winding as modified by multiplication factors introduced by the respective relative values of resistance of each of said resistors.

12. System according to claim 1 wherein the second adder circuit comprises an adder resistor (42) and a source (47) of substantially constant current supplying said resistor (42), the resistor being further connected to the common junction (41).

13. System according to claim 10 wherein the source of substantially constant current comprises a resistor (47) connected to a stabilized voltage power supply (16, 17).

14. A system according to claim 1 wherein the first adder circuit comprises a group of adder resistors (35–38), each resistor of the group being connected to a respective one of the motor armature windings (10–13) through the respective diode (31–34) with one terminal thereof and each having a resistance value high with respect to that of the respective diode (31–34), the other terminal of said resistors (35–38) being connected in common to a common junction (41);

and wherein the second adder circuit comprises a common adder resistor (42) connected to said common junction (41) of the resistors (35–38);

and a constant current source (47) is provided common to the resistors of both said adder circuits connected to the other terminal of said common adder resistor (42) to add the undulating d-c signal from the second a-c voltage, and to add the first a-c voltage thereto and thus form said output signal ($u_D$).

15. System according to claim 1 wherein the motor is a multipole phonograph turntable motor; in combination with a phonograph turntable, the rotor (R) of the motor (M) being directly coupled (C) to the phonograph turntable (T).

16. System according to claim 2 wherein the motor is a multipole phonograph turntable motor; in combination with a phonograph turntable (T), the rotor (R) of the motor (M) being directly coupled (C) to the phonograph turntable (T);

wherein the first adder circuit comprises a group of adder resistors (35–38), each resistor of the group being connected through the respective diode (31–34) to a respective one of the motor armature windings (10–13) with one terminal thereof, the other terminal of said resistors (35–38) being connected to the common junction (41);

the second adder circuit comprises a common adder resistor (42) connected to said common junction (41) of the resistors (35–38);

and wherein the speed control circuit comprises an amplifier circuit means (44) connected to the other terminal of said common adder resistor (42).

17. A system according to claim 16 wherein the relative resistance relationship of the group of resistors (35–38) and the resistance value of said adder resistor (42) is adjustable to vary the motor speed.

18. System according to claim 16 wherein the resistance value of any of the resistors (35–38) of said group is large with respect to the internal resistance of the respectve diode (31–34) connected to the respective armature winding (10–13) to provide the rectified induced voltages.

19. System according to claim 18 wherein said turntable motor is an eight-pole motor; and the resistance of any of the resistors (35–38) of the group is in the order of about 400 ohms, and the resistance of said common adder resistor (42) is about twice that of the resistance of any of said resistors (35–38) of the group.

20. System according to claim 4 wherein the resistance value of each of said common connected resistors (35–38) of the group is high with respect to that of the internal resistance of the respectively connected diode (31–34).

21. System according to claim 20 wherein the resistance value of said additional adding resistor (42) is approximately twice that of the resistance value of any one of said adder resistors (35–38) of the group.

* * * * *